(12) United States Patent
Kim et al.

(10) Patent No.: US 7,828,563 B2
(45) Date of Patent: Nov. 9, 2010

(54) ELECTRONIC DEVICE

(75) Inventors: Dong-sung Kim, Suwon-si (KR);
Min-kyu Park, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 113 days.

(21) Appl. No.: 11/953,209

(22) Filed: Dec. 10, 2007

(65) Prior Publication Data

US 2009/0017655 A1  Jan. 15, 2009

(30) Foreign Application Priority Data

Jul. 10, 2007  (KR) ............... 10-2007-0069284

(51) Int. Cl.
*H01R 13/44* (2006.01)
(52) U.S. Cl. ............................................. 439/133

(58) Field of Classification Search ............... 439/133, 439/131, 540.1, 8, 11, 954
See application file for complete search history.

(56) References Cited

U.S. PATENT DOCUMENTS

| 7,104,837 B1 * | 9/2006 | Huang ............... 439/540.1 |
| 2003/0087541 A1 * | 5/2003 | Sato et al. ............... 439/188 |
| 2007/0023228 A1 * | 2/2007 | Lin ............... 181/148 |

* cited by examiner

*Primary Examiner*—Alexander Gilman
(74) *Attorney, Agent, or Firm*—Stanzione & Kim LLP

(57) ABSTRACT

An electronic device including an electronic device main body provided with an external device connection terminal and a plurality of manipulation keys, an external device manipulation unit to surround the connection terminal, the external device manipulation unit being movable in at least two positions, and a main control unit to control manipulation signals input from the manipulation keys and the external device manipulation unit is provided.

25 Claims, 14 Drawing Sheets

ELECTRONIC DEVICE

CROSS-REFERENCE TO RELATED APPLICATIONS

This application claims priority under 35 U.S.C. §119 (a) from Korean Patent Application No. 10-2007-0069284, filed on Jul. 10, 2007, in the Korean Intellectual Property Office, the disclosure of which is incorporated herein by reference in its entirety.

BACKGROUND OF THE INVENTION

1. Field of the Invention

The present general inventive concept relates to an electronic device. More particularly, the present general inventive concept relates to an electronic device that can be connected to an external device through an external device connection terminal.

2. Description of the Related Art

Electronic devices such as a general audio device, a home theater, a computer, a PMP (Portable Multimedia Player), a mobile phone, and a digital multimedia device, have functions of storing or playing audio signals or video signals.

The electronic device is provided with a connection terminal such as a USB (Universal Serial Bus) terminal into which a USB port provided in an external device is inserted, and performs signal transmission/reception with the external device.

Specifically, the electronic device receives an audio or video signal stored in the external device through the connection terminal and plays the received audio or video signal. By contrast, the external device receives an audio or video signal from the electronic device connected through the connection terminal.

Alternatively, if the external device is connected to the connection terminal of the electronic device, a user inputs a desired manipulation signal by manipulating a plurality of manipulation keys provided on an external surface of the electronic device.

However, the manipulation keys provided on the electronic device is arranged in a specified position that is apart from the connection terminal of the external device. Accordingly, the user should identify and manipulate a desired manipulation key among the plurality of manipulation keys that are apart from the connection terminals after the user connects the electronic device to the external device through the connection terminal, and this causes an inconvenience to the user.

Accordingly, the user's manipulation of keys to perform a signal exchange between the electronic device and the external device in a state that the devices are connected is deteriorated.

SUMMARY OF THE INVENTION

The present general inventive concept provides an electronic device that can improve a user's manipulation of keys in a state that the electronic device is connected to an external device.

Additional aspects and utilities of the present general inventive concept will be set forth in part in the description which follows and, in part, will be obvious from the description, or may be learned by practice of the general inventive concept.

The foregoing and other objects and utilities are substantially realized by providing an electronic device which includes an electronic device main body provided with an external device connection terminal and a plurality of manipulation keys, an external device manipulation unit to surround the connection terminal, the external device manipulation unit being movable in at least two positions, and a main control unit to control manipulation signals input from the manipulation keys and the external device manipulation unit.

The external device manipulation unit may include a manipulation unit being manipulated in a state that the manipulation unit surrounds the connection terminal, a switch being operated by the manipulation unit, and a circuit board on which the connection terminal and the switch are disposed so that the connection terminal and the switch can exchange signals, and the circuit board transferring the signals to the main control unit.

The manipulation unit may be rotatable between a standby position and a manipulation position.

The manipulation unit may include a rotary member to rotate from an initial position along an outer periphery of a connection terminal holder to support the connection terminal, a projection, formed to project from the rotary member, to operate the switch by a movement of the rotary member, and an elastic unit to return the rotary member to the initial position.

The manipulation unit may have a first manipulation position by rotating in one direction and a second manipulation position by rotating in an other direction, and the main control unit may perform first and second functions which are different from each other corresponding to the first and second manipulation positions, respectively.

The switch may be a lever switch being interfered with a bidirectional rotation of the manipulation unit and rotating in a bi-direction.

The elastic unit may include a first elastic member to press a movable member in the other direction, and a second elastic member to press the movable member in the one direction.

The first and second elastic members may be torsion springs, and the rotary member may have a pair of movable grooves into which end portions of the first and second elastic members are inserted.

The elastic unit may further include a sub elastic member, disposed on the lever switch, to return the lever switch to the initial position.

The rotary member may be provided with a handle.

The electronic device may further include a display unit to display the manipulation signal input from the plurality of manipulation keys and the external device manipulation unit.

The display unit may include a display window provided on a front surface of the electronic device main body, and a light-emitting unit, disposed between the connection terminal and the external device manipulation unit, to emit light of different colors.

The light-emitting unit may include first light-emitting members, disposed on the circuit board to surround an outer periphery of the connection terminal, to display a connection state of the external device to the connection terminal, and second light-emitting members, disposed on the circuit board to surround an outer periphery of the first light-emitting members, to display a signal exchange state between the electronic device main body and the external device.

The first light-emitting members may emit light at predetermined intervals when the external device is connected to the connection terminal, and the second light-emitting members may emit light corresponding to the rotational direction of the rotary member.

The first and second light-emitting members may emit blue light and red light, respectively.

The first light-emitting member may emit light even when the manipulation signal is input by the manipulation key of the electronic device main body.

The connection terminal holder may be made of a light-transmitting material, and may be provided with an interception wall to intercept a light interference between the first and second light-emitting members.

A frame on which the elastic unit is disposed is provided between the electronic device main body and the circuit board.

An installation hole to install the connection terminal, the connection terminal holder, and the rotary member may be formed on the frame, and hooks to prevent the rotary member from seceding from the installation hole may be provided in the rotary member.

The electronic device may further include a stopper unit to limit a rotation range of the manipulation unit.

The stopper unit may include a hooking projection projected from the frame, and a pair of hooking jaws, provided in the rotary member, to hook up with the hooking projection.

The rotating angle between the standby position of the manipulation unit and the first/second manipulation position may be 60°.

The external device may include an MP3 player, wherein the first function may include a function of recording a portion of data stored in the electronic device main body in the MP3 player, and the second function may include a function of recording all data stored in the electronic device main body in the MP3 player.

The first function may include a third function of safely removing the external device from the connection terminal corresponding to the rotary member remaining in the first manipulation position for a specified time.

The electronic device main body may include a CD player.

The manipulation unit may surround the connection terminal and be rotatable in multistages.

The manipulation unit may surround the connection terminal and be slidable in multistages.

The foregoing and/or other aspects and utilities of the general inventive concept may also be achieved by providing an electronic device, which includes an electronic device main body provided with an external device connection terminal and a plurality of manipulation keys, an external device manipulation unit to surround the connection terminal, the external device manipulation unit being movable in at least two positions, a display unit to display input manipulation signals, and a main control unit to control the manipulation signals input from the manipulation keys and the external device manipulation unit.

The external device manipulation unit may be rotatable in a bi-direction along an outer periphery of the connection terminal, and the display unit may emit light of different colors according to the input manipulation signals.

The main control unit may record a portion of data of the electronic device main body in the external device if the external device manipulation unit rotates in one direction, and record all data of the electronic device main body in the external device if the external device manipulation unit rotates in an other direction.

The foregoing and/or other aspects and utilities of the general inventive concept may also be achieved by providing an electronic device, which includes an electronic device main body provided with an external device connection terminal and a plurality of manipulation keys, a manipulation unit to manipulate data transmission between the electronic device main body and the external device through the connection terminal, a display unit to display a data transmission state through the external device connection terminal, and a main control unit to control the data transmission and display of the data transmission state according to the manipulation of the manipulation unit.

The electronic device may further include a first circuit board, connected to the plurality of manipulation keys of the manipulation unit, and the display unit, to transfer a control signal to the main control unit, a second circuit board to receive the control signal from the first circuit board, the second circuit board including the main control unit, and a connection unit to connect the first circuit board with the second circuit board.

The electronic device may further include a switch to output the control signal in accordance with a rotation of the manipulation unit, and a stopper unit to limit a rotation range of the manipulation unit.

The manipulation unit may have a first manipulation position by rotating in one direction and a second manipulation position by rotating in an other direction, and the main control unit may generate digital compressed data from specified sound sources corresponding to the first and second manipulation positions and transmit the digital data to the external device connected through the connection terminal.

The foregoing and/or other aspects and utilities of the general inventive concept may also be achieved by providing an electronic device, which includes an electronic device main body provided with an external device connection terminal and a plurality of manipulation keys, a manipulation unit to rotate so as to manipulate data transmission of the electronic device main body, and a main control unit to generate digital compressed data from specified sound sources corresponding to a rotation of the manipulation unit and to transmit the digital data to the external device connected through the external device connection terminal.

The foregoing and/or other aspects and utilities of the general inventive concept may also be achieved by providing a manipulation unit usable with an electronic device, the manipulation unit including a rotary member to rotate to one or more predetermined positions, an external device connecting portion disposed within the rotary member to allow an external device to connect to the electronic device, and a control unit to control a function corresponding to the one or more predetermined position of the rotary member of at least one of the electronic device and the external device.

The foregoing and/or other aspects and utilities of the general inventive concept may also be achieved by providing an electronic device including an electronic device main body having an external device connection terminal to receive an external device and a plurality of manipulation keys to manipulate functions thereof, and a manipulation unit movable to represent a status between the external device and the external device connection terminal.

BRIEF DESCRIPTION OF THE DRAWINGS

The above aspects and utilities of the present general inventive concept will be more apparent by describing certain embodiments of the present general inventive concept with reference to the accompanying drawings, in which.

DETAILED DESCRIPTION OF THE PREFERRED EMBODIMENTS

Figure 1:
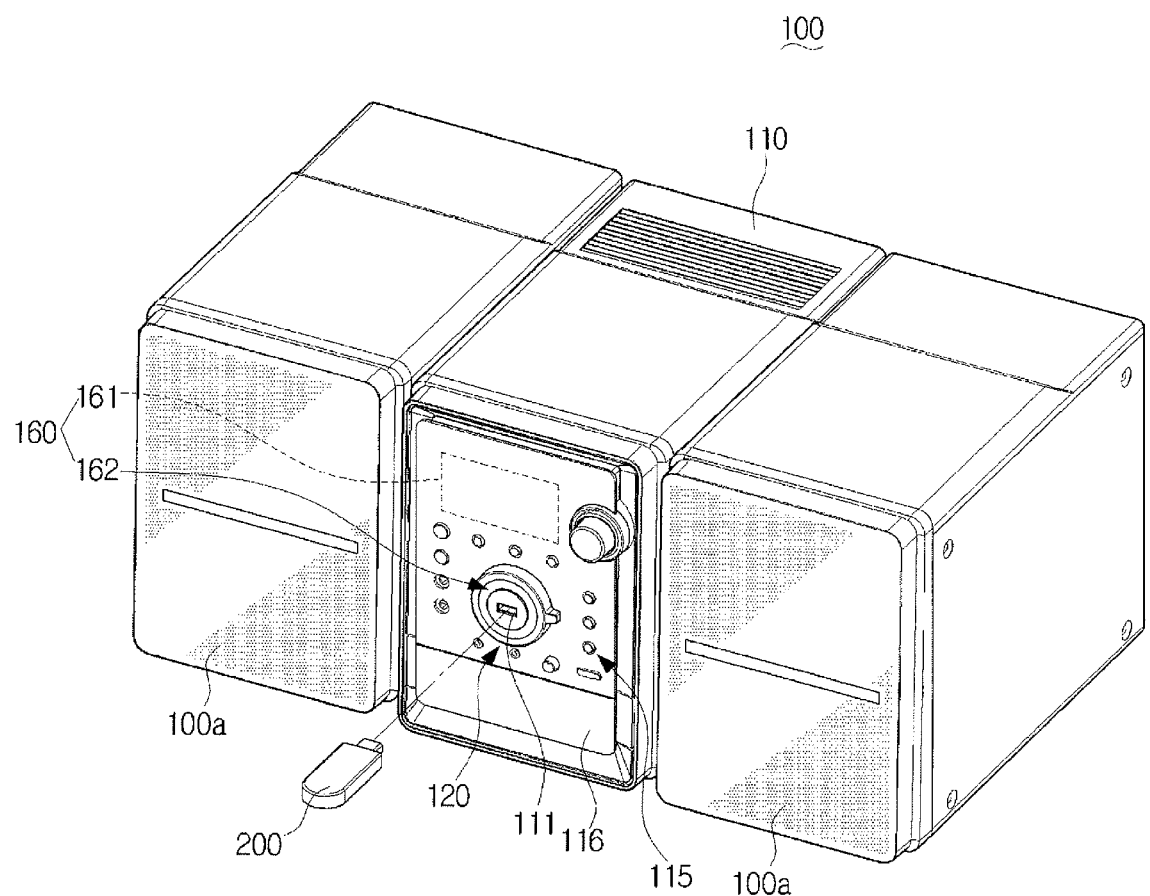
FIG. 1 is a perspective view schematically illustrating an electronic device and an external device according to an exemplary embodiment of the present general inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Figure 10:
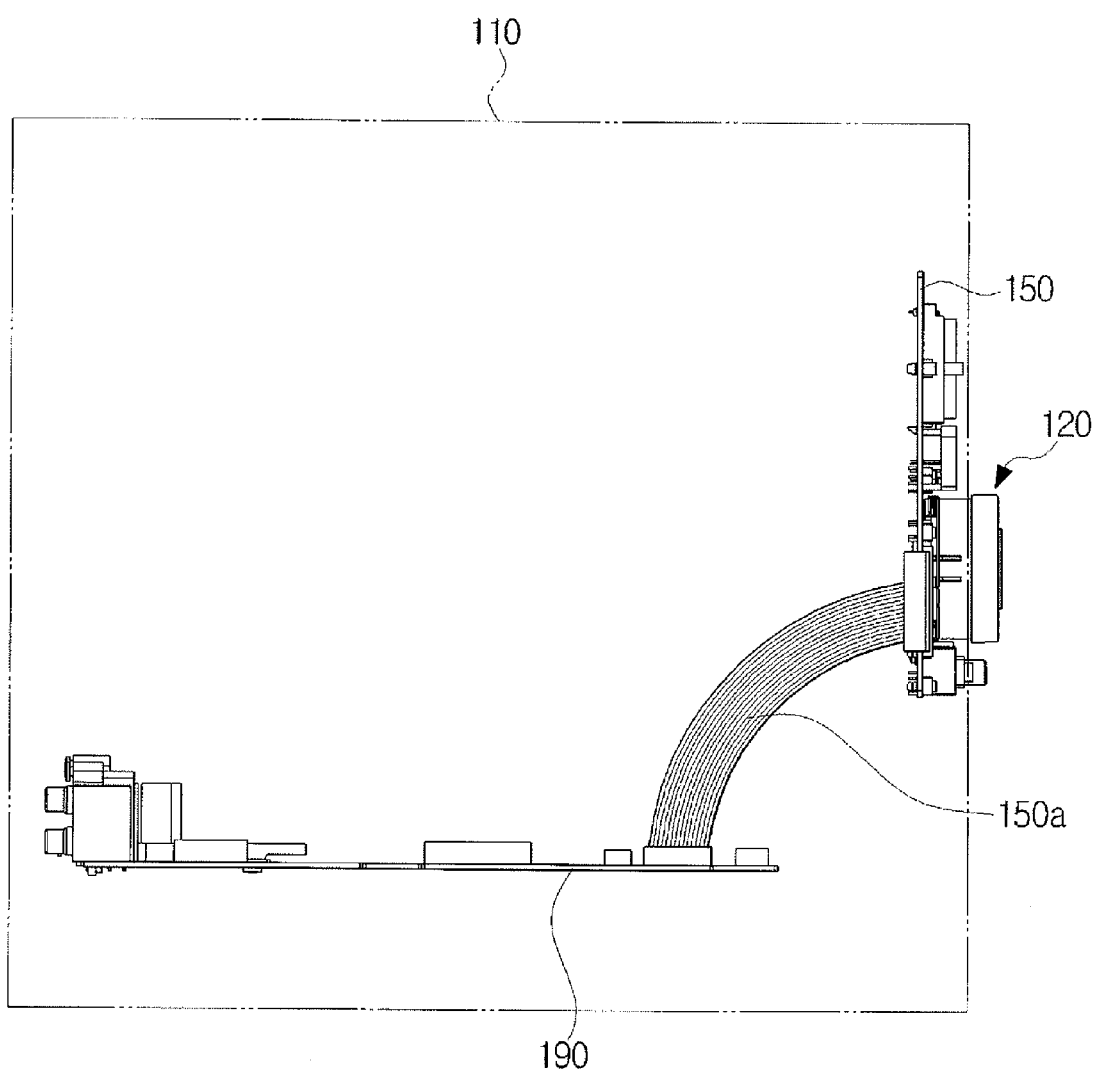
FIG. 10 is a view schematically illustrating a connection state between a main control unit and a circuit board according to an exemplary embodiment of the present general inventive concept.

Referring to FIG. 1, an electronic device 100 according to an exemplary embodiment of the present general inventive concept includes an electronic device main body 110, an external device manipulation unit 120, a display unit 160, a stopper unit 180 (FIG. 7A), and a main control unit 190 (FIG. 10).

The electronic device main body 110 protects built-in components, and an external device connection terminal 111 and a plurality of manipulation keys 115 are provided on the front surface of the main body 110.

Figure 2A:
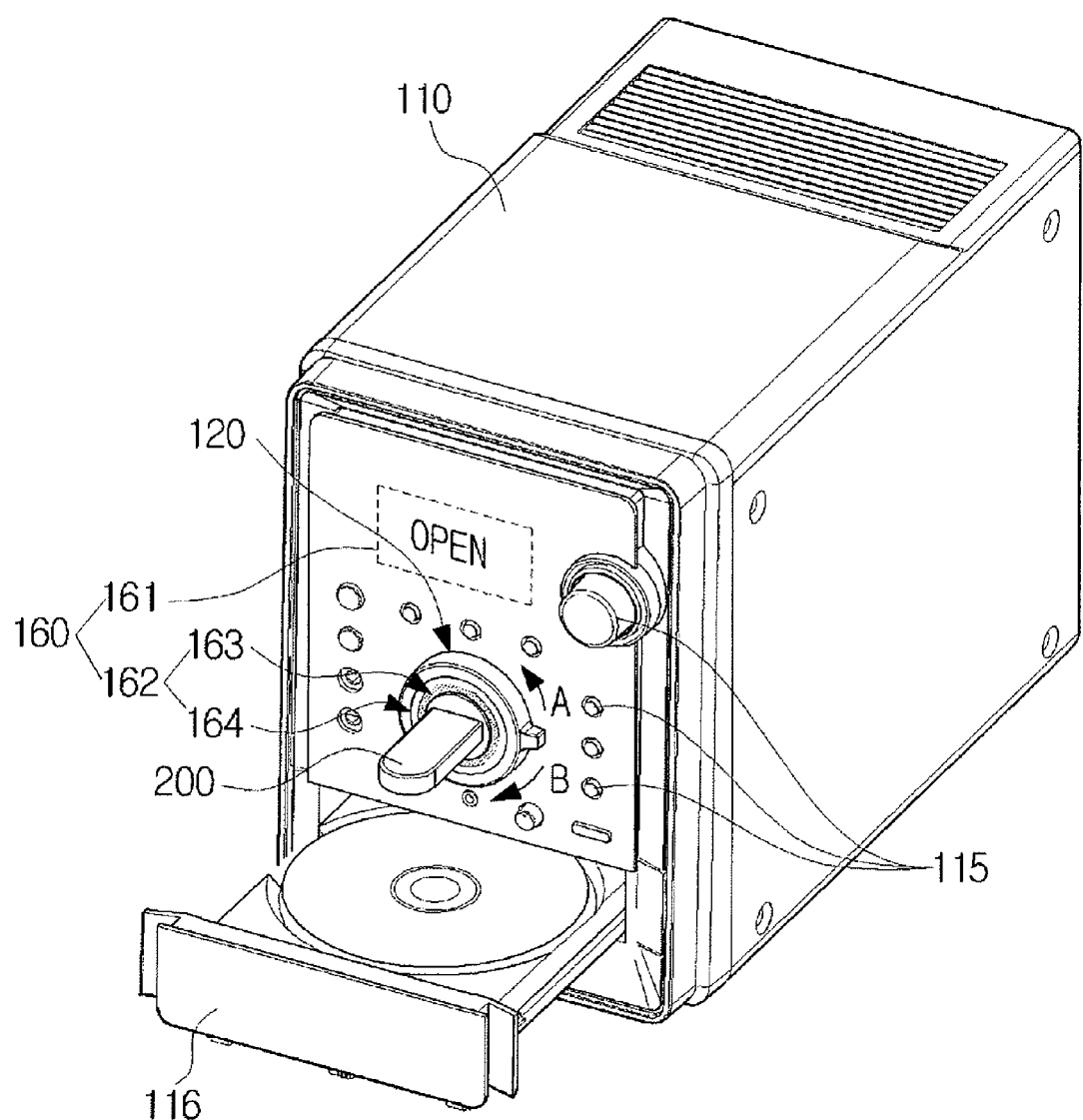
FIGS. 2A to 2C are perspective views schematically illustrating a state of the external device connected to the electronic device as illustrated in FIG. 1.
Figure 2B:
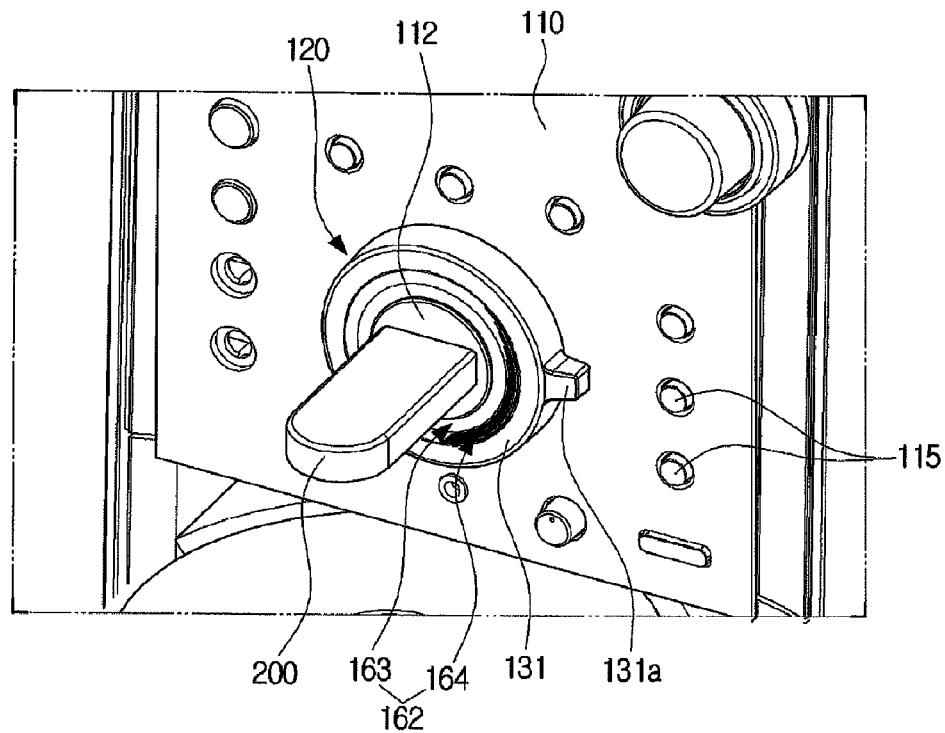
Figure 2C:
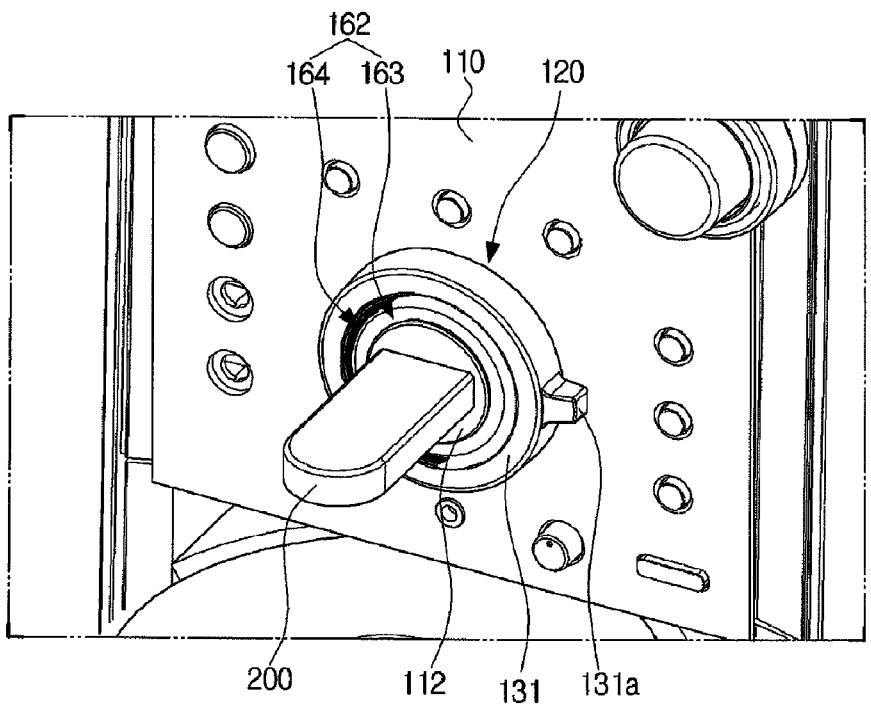

The external device connection terminal 111, as illustrated in FIGS. 1 to 2C, is connected to an external device 200. In the present embodiment, the external device 200 may be a USB device that transmits/receives a specified signal to/from other devices through a USB port (not illustrated). Accordingly, the external device connection terminal 111 may be a USB terminal.

The external device 200 can be connected to the external device connection terminal 111 through a separate cable (not illustrated). However, in the present embodiment, it is illustrated that the external device 200 is directly connected to the external device connection terminal 111.

The manipulation keys 115 may include a power key, a volume adjustment key, a play/pause key, a tuner key, a direction key, a movement key, a stop key, an open/close key, and the like.

In the present embodiment, the electronic device 100 includes an audio device to output an input audio signal such as a CD player, and the external device 200 includes an MP3 player to store and/or output a signal converted into an MP3 file. For this, at a front lower end of the electronic device main body 110, as illustrated in FIG. 2A, a CD tray 116 is movably disposed. Also, on both sides of the electronic device main body 110, as illustrated in FIG. 1, speakers 100a to output an audio signal are disposed.

However, the electronic device and the external device are not limited thereto, but include diverse devices that can transmit/receive specified signals, such as a portable media player (PMP), a DVD player, a home theater, a digital multimedia device, a mobile phone, a computer, and the like.

The external device manipulation unit 120, as illustrated in FIGS. 2A to 2C, surrounds the external device connection terminal 111, and is disposed to be movable in at least two positions. The external device manipulation unit 120 manipulates a signal exchange between the external device 200 and the electronic device 100 in a state that the external device 200 is connected to the external device connection terminal 111. The electronic device main body 110 may include a major surface (front surface) on which the manipulation keys 115 and the external device connection terminal 120, and/or the electronic device manipulation unit 120 are disposed. The external device manipulation unit 120 includes a manipulation unit 130, a switch 140, and a circuit board 150 as illustrated in FIG. 3.

Figure 3:
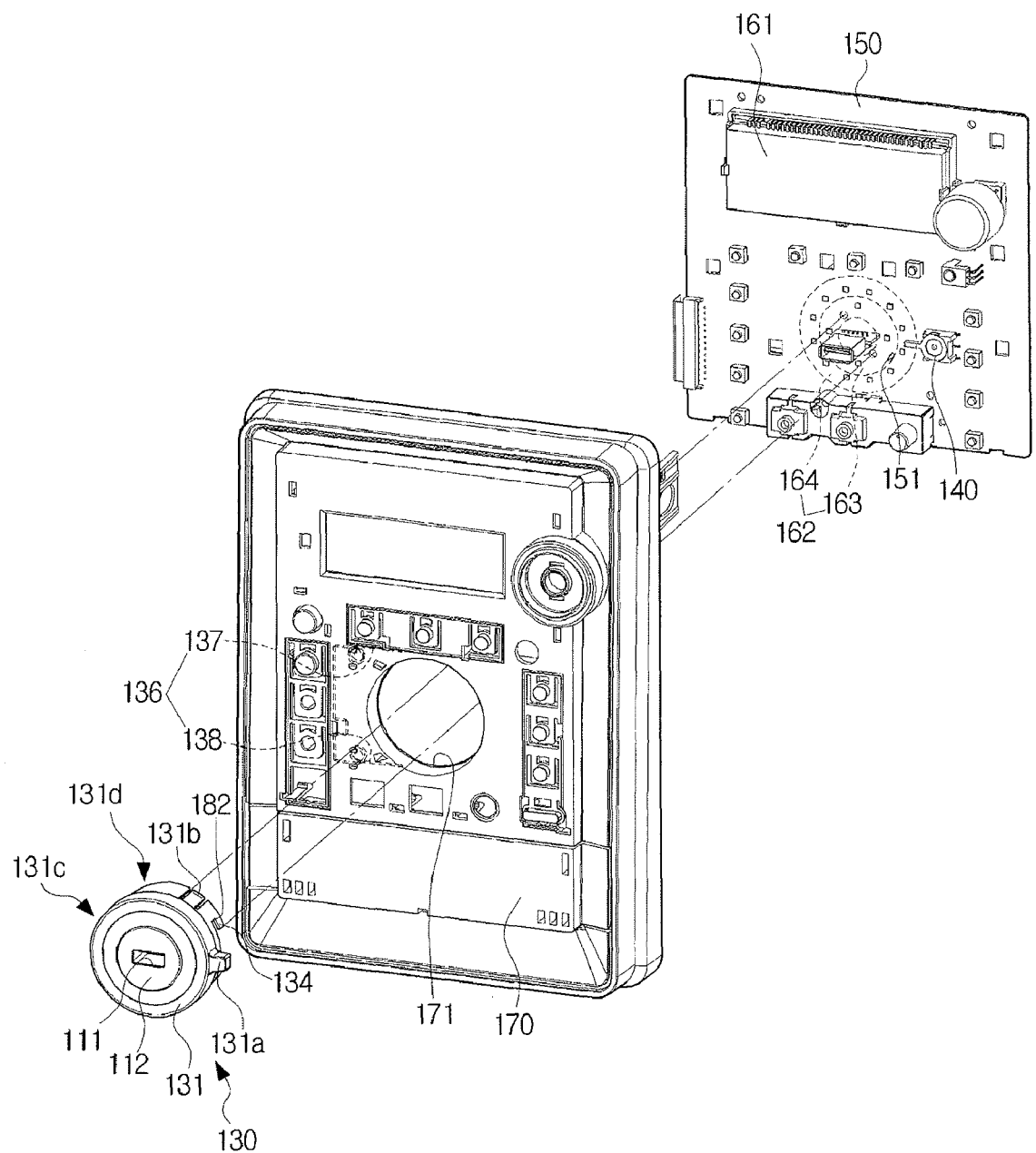
FIG. 3 is an exploded perspective view of an external device manipulation unit as illustrated in FIG. 1.
Figure 4:
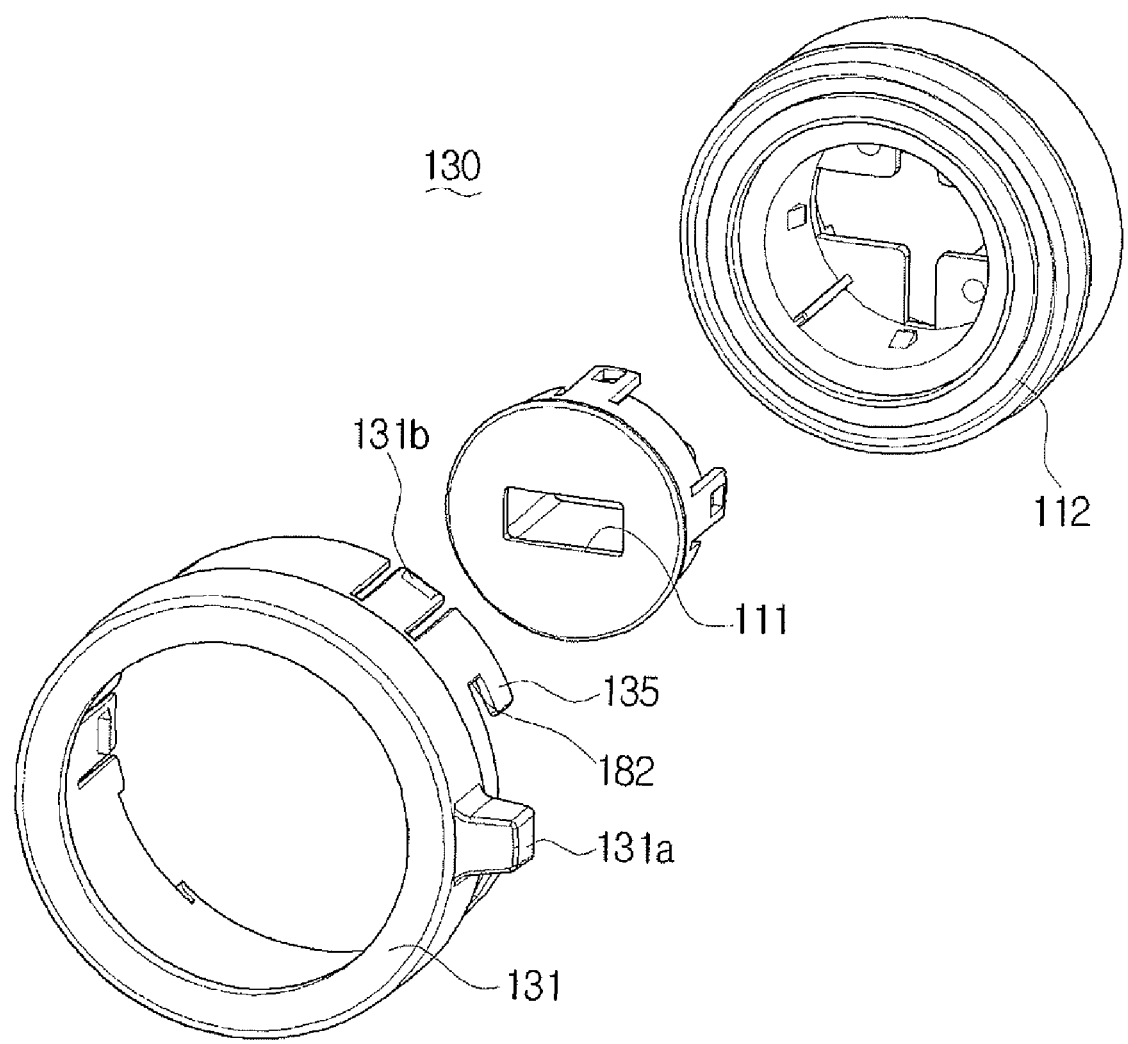
FIG. 4 is an exploded perspective view of a manipulation unit as illustrated in FIG. 3.
Figure 5:
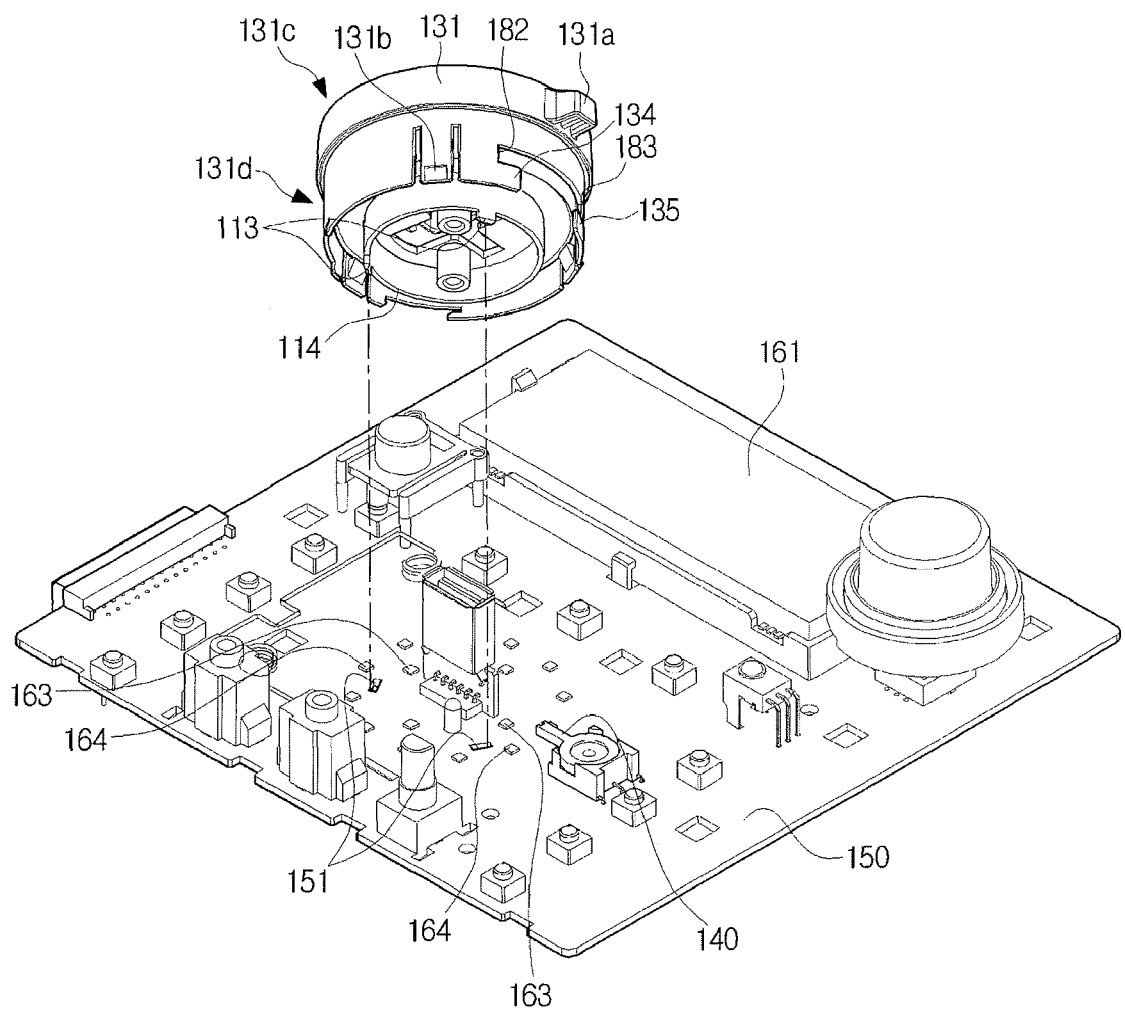
FIG. 5 is a perspective view schematically illustrating a state of a rotary member disposed on a circuit board according to an exemplary embodiment of the present general inventive concept.

The manipulation unit 130, as illustrated in FIGS. 3 to 5, is manipulated in a state that the manipulation unit 130 surrounds the external device connection terminal 111, and includes a rotary member 131, first and second projections 134 and 135, and an elastic unit 136.

The rotary member 131 is rotated in a state that the rotary member 131 surrounds the external device connection terminal 111. Specifically, as illustrated in FIG. 4, the rotary member 131 is rotated along an outer periphery of a cylindrical connection terminal holder 112 that supports the external device connection terminal 111.

The rotary member 131 is rotated between a standby position and the first/second manipulation position through the user's manipulation thereof. Here, the first manipulation position of the rotary member 131 is the position rotated in a direction indicated by an arrow A in FIGS. 2A and 6B, i.e., counterclockwise, opposite to the standby position. Also, the second manipulation position is the position rotated in a direction indicated by an arrow B, i.e., clockwise, opposite to the standby position.

The rotary member 131 has a handle portion 131a formed thereon to project outwardly from the electronic device main body 110. As illustrated in FIG. 3, a front surface region 131c of the rotary member 131, on which the handle portion 131a is provided, is exposed outwardly from the electronic device main body 110. Also, a rear surface region 131d of the rotary member 131 is disposed inside the electronic device main body 110.

The rotary member 131 can be in a form of a hollow cylinder to surround an edge of the connection terminal holder 112 so that the external device connection terminal 111 and an upper surface of the connection terminal holder 112 to support the connection terminal 111 are exposed from the electronic device main body 110.

Figure 6A:
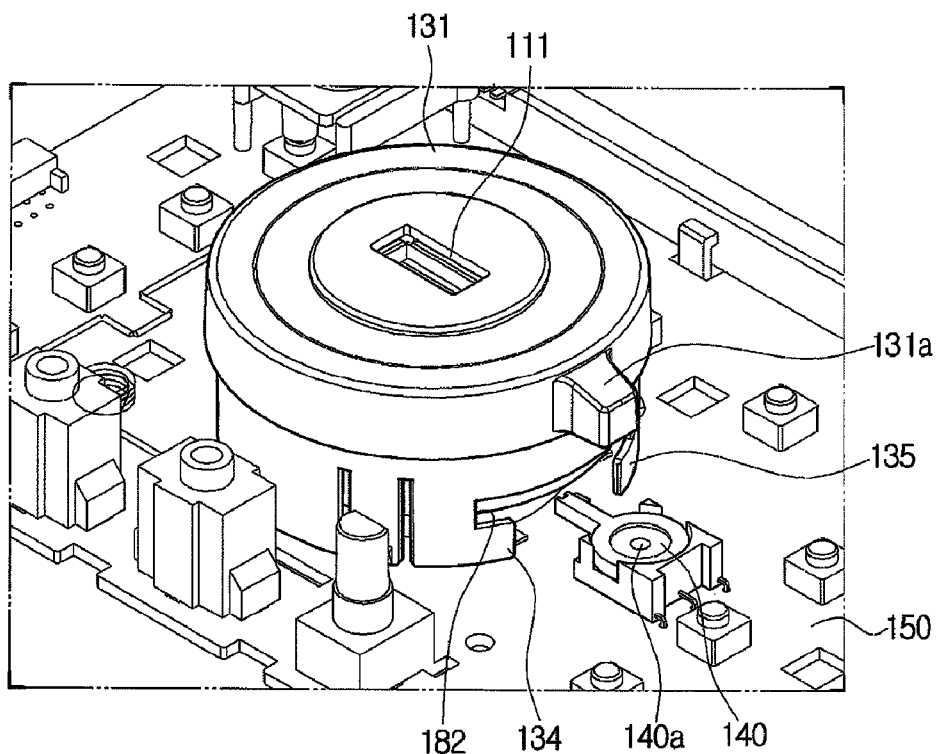
FIGS. 6A to 6C are perspective views schematically illustrating an operation state of a switch through a projection according to an exemplary embodiment of the present general inventive concept.
Figure 6B:
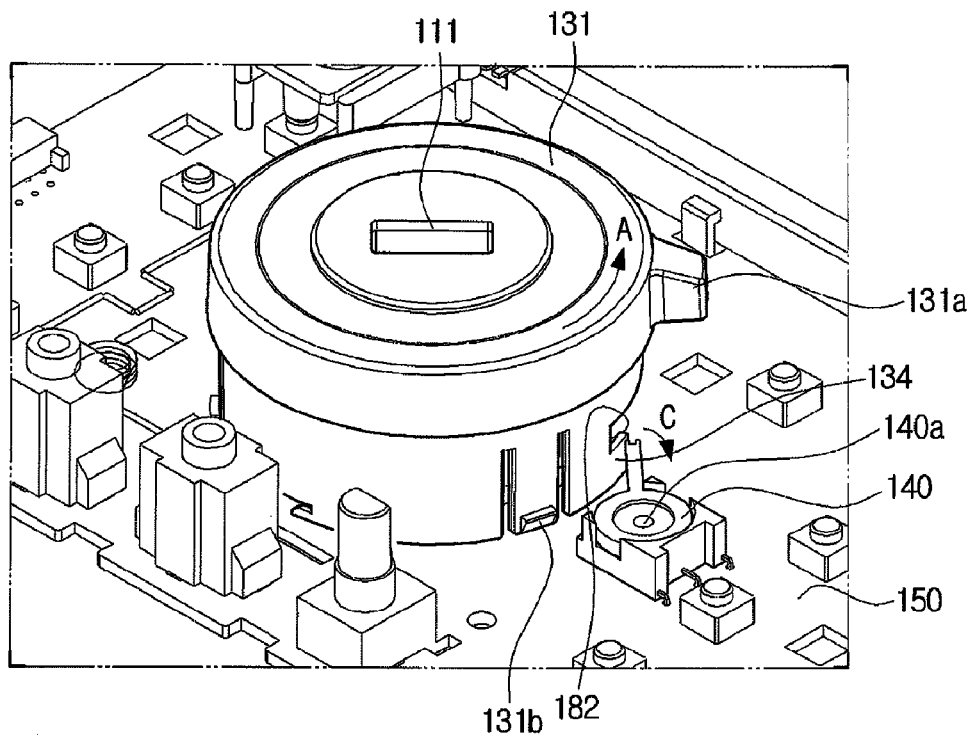
Figure 6C:
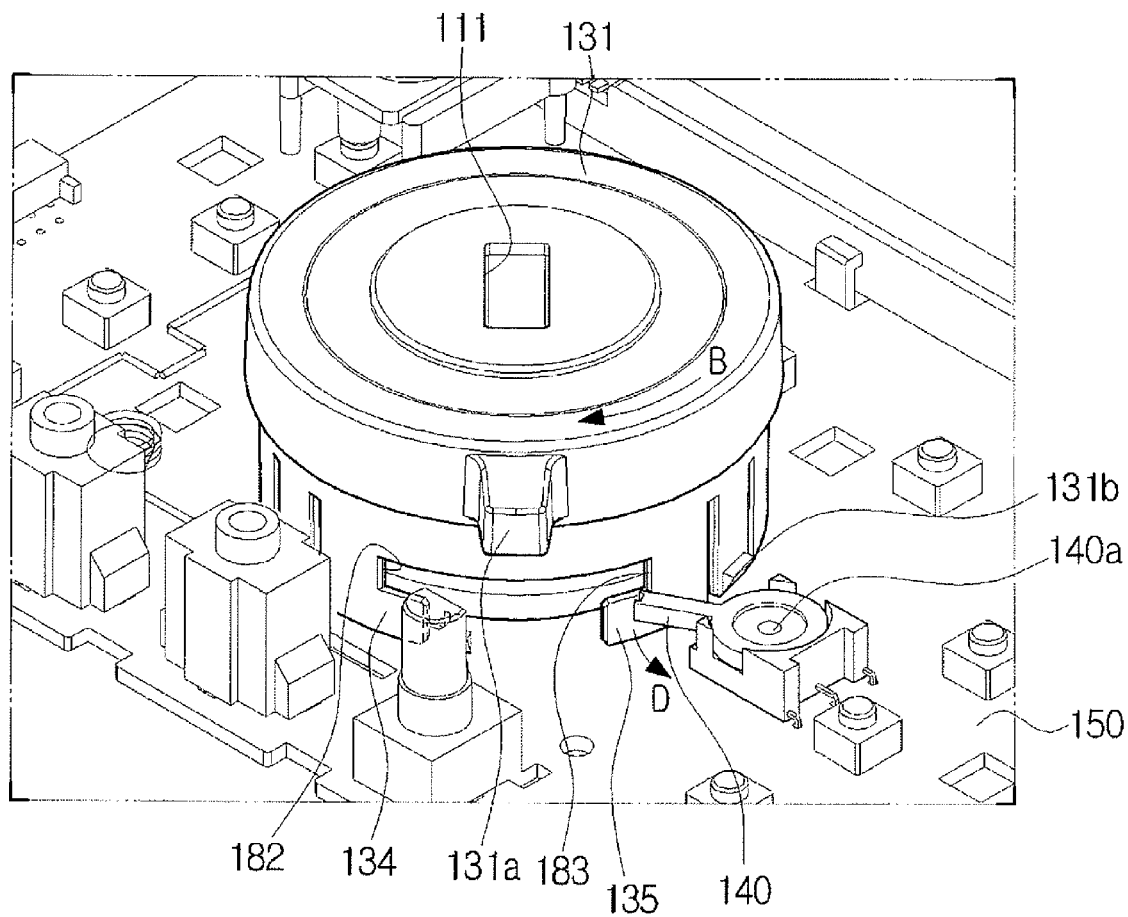

The first and second projections 134 and 135 are formed to project from the rotary member 131, and to operate the switch through movement of the rotary member 131, as illustrated in FIGS. 6A to 6C.

In the present embodiment, as illustrated in FIG. 5, the front surface region 131c of the rotary member 131, on which the handle portion 131a is provided, is made of metal, and the rear surface region 131d of the rotary member 131, on which the first and second projections 134 and 135 are provided, is made of plastic. This is in consideration of a strength of the handle portion 131a manipulated by a user and the front surface region 131c of the rotary member 131.

Figure 7A:
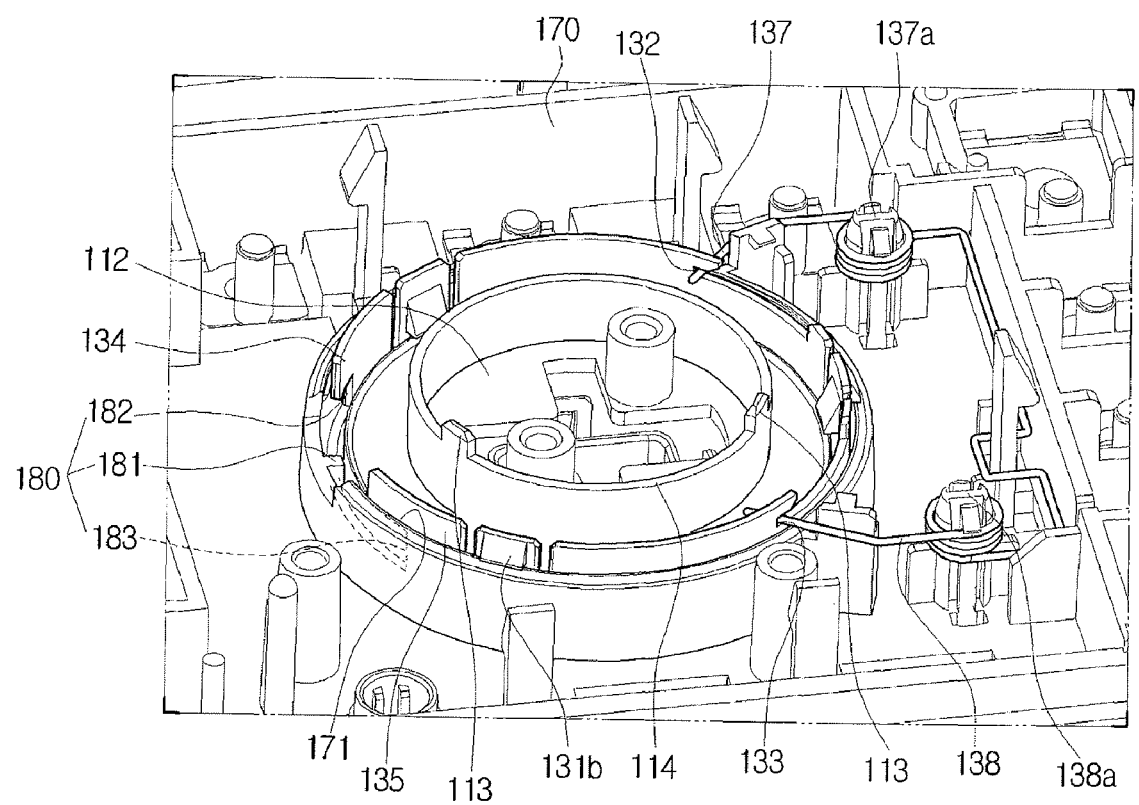
FIGS. 7A to 7C are perspective views schematically illustrating an operation state of first and second elastic members by rotation of a rotary member according to an exemplary embodiment of the present general inventive concept.
Figure 7B:
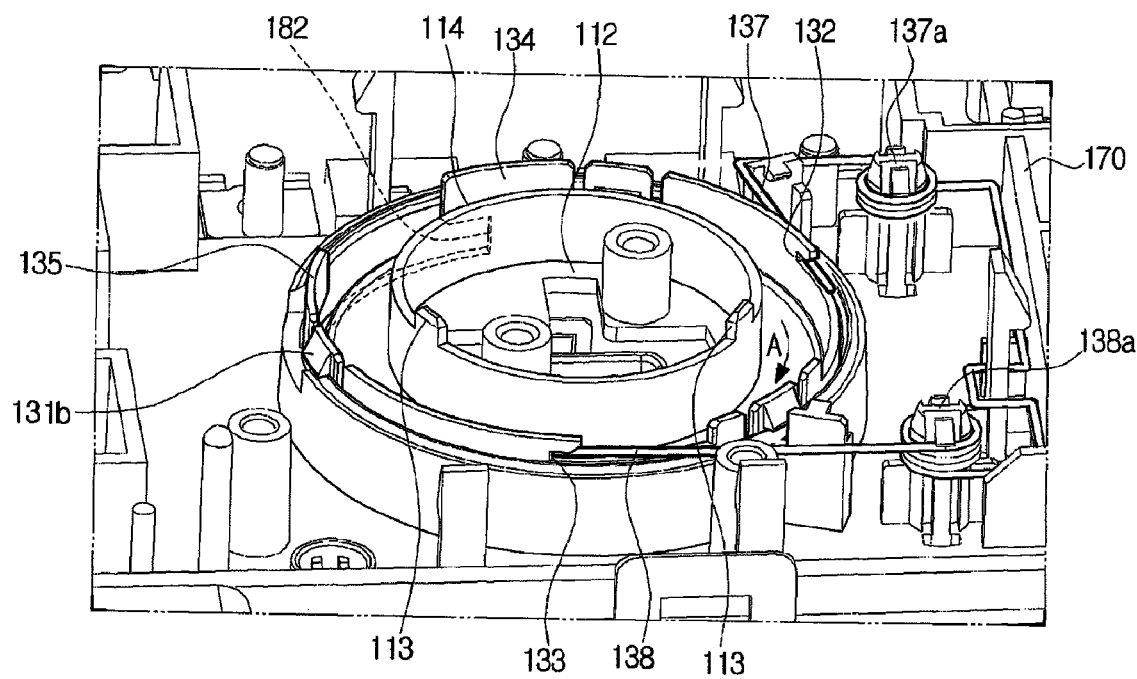
Figure 7C:
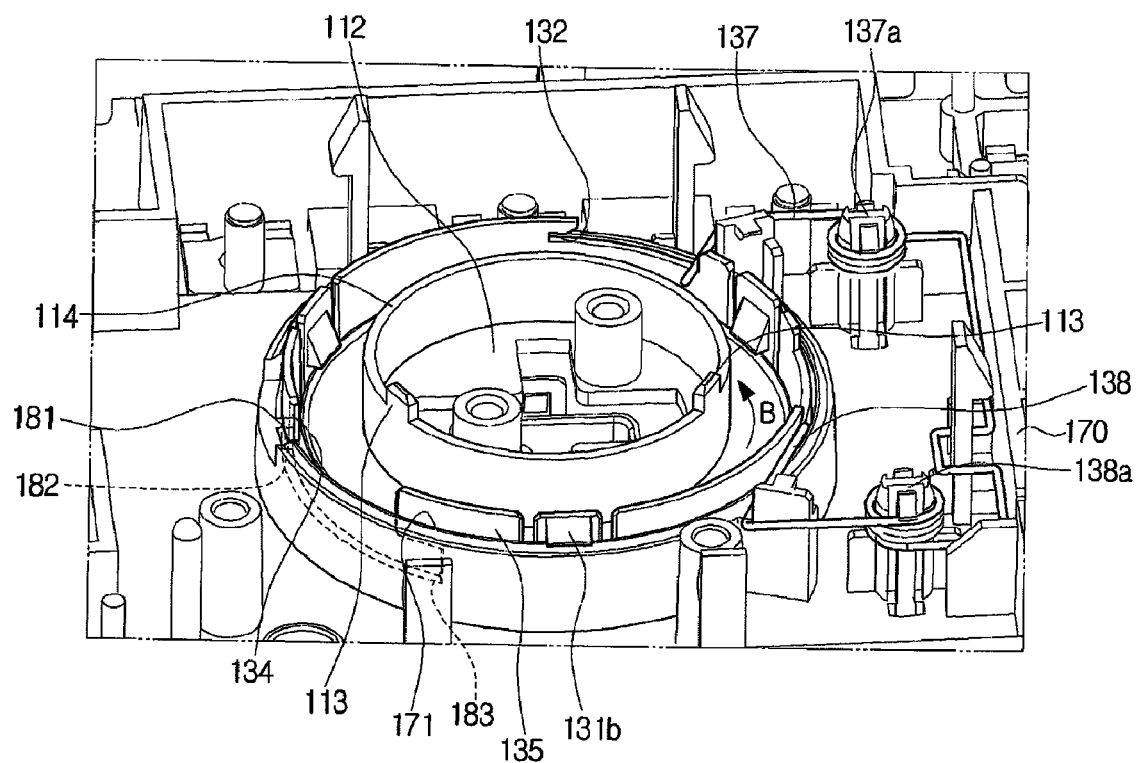
Figure 8:
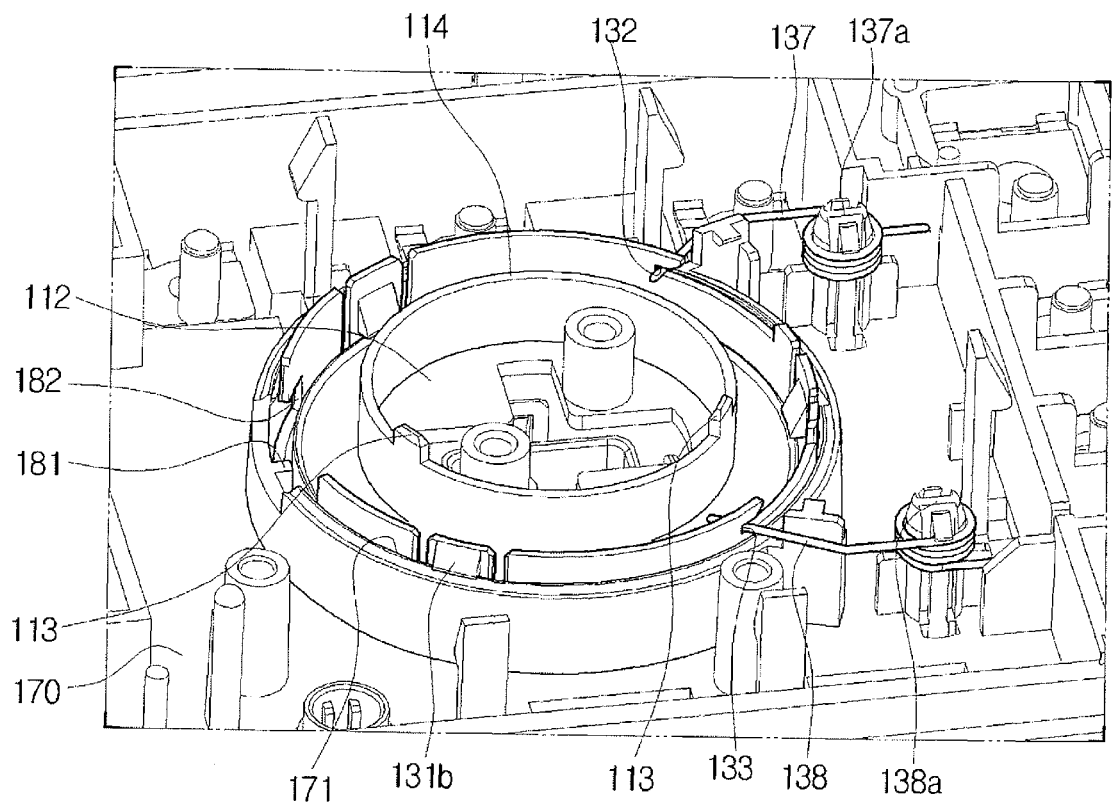
FIG. 8 is a perspective view schematically illustrating another embodiment of the first and second elastic members.

The elastic unit 136 (FIG. 3) returns the rotary member 131 which has been rotated to reach the first or second manipulation position to the standby position. In the present embodiment, the elastic unit 136 includes first and second elastic members 137 and 138 as illustrated in FIG. 7C. Referring to FIG. 7C, the first and second elastic members 137 and 138 are torsion springs disposed on first and second support shafts 137a and 138a provided on a frame that is disposed between the front surface of the electronic device main body 110 and the circuit board 150 as illustrated in FIGS. 3 and 7A to 7C. Here, the first and second support shafts 137a and 138a are provided on a rear surface of the frame 170 that is opposite to the circuit board 150.

As illustrated in FIG. 3, an installation hole 171 to install the external device connection terminal 111, the connection terminal holder 112, and the rotary member 131 is formed on the frame 170. Also, hooks 131b to prevent the rotary member 131 from seceding from the installation hole 171 are provided in the rotary member 131, as illustrated in FIGS. 7A to 7C. Here, the hook 131b is inserted into the frame 170 through the installation hole 171, and then is hooked on the rear surface of the frame 170 that faces the circuit board 150.

Both sides of the hook 131b are cut and separated from the rotary member 131, as illustrated in FIGS. 3 and 4, and elastically fix the rotary member 131 to the installation hole 171 like a leaf spring.

As illustrated in FIG. 7A, end portions of the first and second elastic members 137 and 138 are inserted into first and second movable grooves 132 and 133 provided on the rotary member 131, and other end portions of the first and second elastic members are connected together. That is, the first and second elastic members 137 and 138 can be formed in a unitary body.

However, the first and second elastic members 137 and 138 are not limited to be formed in the unitary body, but may be separately formed in a manner that the other end portions of the first and second elastic members 137 and 138 are fixed to the frame 170.

The first and second elastic members 137 and 138 as constructed above return the rotary member 131 to the standby position when the user releases the manipulation force after rotating the rotary member 131 to the first or second manipulation position.

Referring to FIGS. 6A-6C, the switch 140 is a lever switch that is disposed on the circuit board 150 so that the signal exchange between the switch and the circuit board is possible, and is operated by the rotary member 131 that is rotated in a bi-direction, as illustrated in FIGS. 6A to 6C. That is, the switch 140 is interfered with any one of the first and second projections 134 and 135, and is rotated in the bi-direction, i.e., in directions C and D as illustrated in FIGS. 6B and 6C.

Specifically, as illustrated in FIG. 6B, if the rotary member 131 is rotated in a direction A, the switch is rotated in a direction C by the first projection 134, and thus senses that the manipulation unit 130 is in the first manipulation position. By contrast, as illustrated in FIG. 6C, if the rotary member 131 is rotated in a direction B, the switch 140 is rotated in a direction D by the second projection 135, and thus senses that the manipulation unit 130 is in the second manipulation position.

Although not illustrated in the drawing, a sub elastic member 139 to return the operated switch 140, for example, to an initial position, is disposed on a rotary shaft 140a of the switch 140.

On the circuit board 150, the external device connection terminal 111 and the switch 140 are disposed so that the connection terminal 111 and the switch 140 can exchange signals. As illustrated in FIGS. 1 and 10, the circuit board 150 transfers signals to the main control unit 190 connected through a connection cable 150a. That is, the circuit board 150 transfers the signal input from the external device connection terminal 111 and the switch 140 to the main control unit 190. In addition, the circuit board 150 is connected to the plurality of manipulation keys 115 and the display unit 160 so that the circuit board 150 and the keys 115 or the display unit 160 can exchange signals.

As illustrated in FIG. 5, installation grooves 151 to install the connection terminal holder 112 (FIG. 3) are formed on the circuit board 150, and installation projections 113 are formed on the lower surface of the connection terminal holder 112. Accordingly, the connection terminal holder 112 is fixed to the circuit board 150 since the edge thereof is supported by the rotary member 131 after the installation projections 113 are inserted into the installation grooves 151.

The display unit 160 displays the manipulation signals input from the manipulation keys 115 and the external device manipulation unit 120, and as illustrated in FIG. 2A, the display unit 160 includes a display window 161 and a light-emitting unit 162.

As illustrated in FIGS. 1 and 2A, the display window 161 is exposed to the front surface of the electronic device main body 110. Here, the display window 161 is disposed on the circuit board 150 so that the signal exchange between the display window 161 and the circuit board 150 is possible.

The display window 161 displays the manipulation signals input by the user as a text. For example, as illustrated in FIG. 2A, when the CD tray 116 is open from the electronic device main body 110, "OPEN" is displayed on the display window 161.

The light-emitting unit 162 emits light of different colors corresponding to the input manipulation signals, as illustrated in FIGS. 2A to 2C. The light-emitting unit 162 includes first and second light-emitting members 163 and 164 disposed on the circuit board 150 to emit light between the external device connection terminal 111 and the external device 200, as illustrated in FIG. 3.

The first light-emitting members 163 are disposed on the circuit board 150 to surround the outer periphery of the external device connection terminal 111, and display the connection state of the external device 200 to the external device connection terminal 111. In addition, the first light-emitting members 163 display the manipulation state of the plurality of manipulation keys 115.

Figure 9:
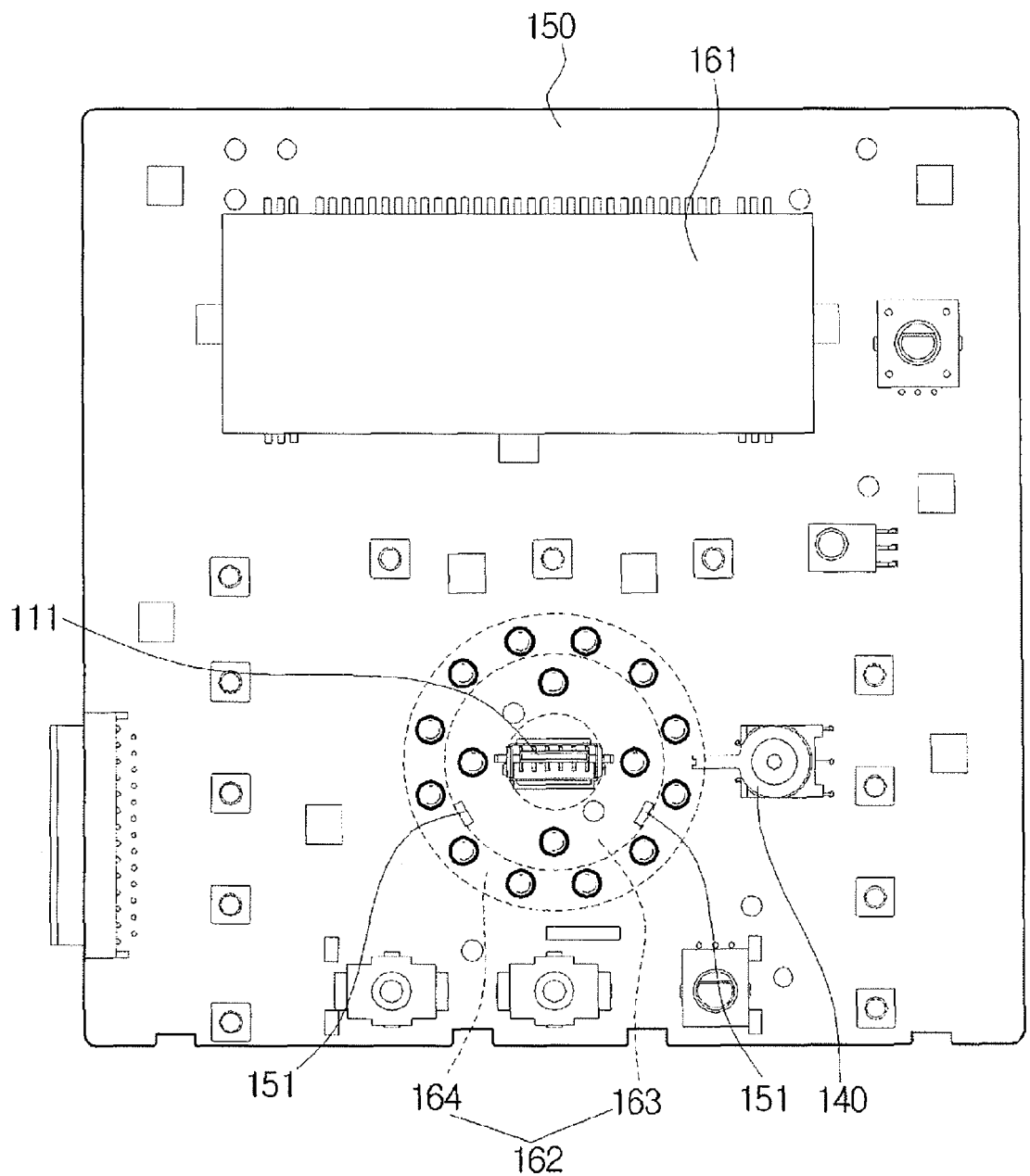
FIG. 9 is a perspective view schematically illustrating another embodiment of first and second light-emitting members.

Here, if the external device 200 is connected to the external device connection terminal 111, the first light-emitting members 163 emit light at specified intervals. That is, the first light-emitting members 163 display the connection state of the external device to the external device connection terminal 111 by flickering. However, in the embodiment as illustrated in FIG. 9, the light-emitting state of the first light-emitting members 163 is maintained while the external device 200 is connected to the external device connection terminal 111.

In addition, even when the manipulation key 115 is manipulated, the first light-emitting members 163 emit light to display the manipulation state.

The second light-emitting members 164 are disposed on the circuit board 150 to surround the outer periphery of the first light-emitting members 163, and display the signal exchange state between the electronic device main body 110 and the external device 200.

Specifically, the second light-emitting members 164 emit light while the rotary member 131 is moved to the first or second manipulation position and performs the first or second function. Here, as illustrated in FIGS. 2B and 2C, the second light-emitting members 164 emit light by turns in one direction, as illustrated in FIGS. 2B and 2C, to display the function performing state.

Alternatively, in the exemplary embodiment of the present general inventive concept, the first and second light-emitting members 163 and 164 are LEDs mounted on the circuit board 150 to emit blue light and red light, respectively. However, as illustrated in FIG. 9, the first and second light-emitting members may be light-emitting diodes disposed on the circuit board 150.

As described above, the light emitted from the first and second light-emitting members 163 and 164 disposed on the circuit board 150 is displayed outward from the electronic device main body 110 through the connection terminal holder 112. Accordingly, the connection terminal holder 112 is made of a light transmitting material such as acryl.

Also, as illustrated in FIG. 5, the connection terminal holder 112 is provided with an interception wall 114 to intercept an interference of light emitted from the first and second light-emitting members 163 and 164. The first light-emitting members 163 are disposed to be opposite to an inner periphery of the interception wall 114, and the second light-emitting members 164 are disposed to be opposite to an outer periphery of the interception wall 114.

On the interception wall 114, installation projections 113, which are inserted into installation grooves 151, respectively, are formed to project outwardly therefrom, and the installation grooves 151 are formed on the circuit board 150 between the first and second light-emitting members 163 and 164.

Referring to FIGS. 7A to 7C, the stopper unit 180 is to limit a rotation range of the manipulation unit 130 (FIG. 4), and includes a hooking projection 181 and first and second hooking jaws 182 and 183.

As illustrated in FIGS. 7A to 7C, the hooking projection 181 is formed to project from the installation groove 151 of the frame 170. Specifically, the hooking projection 181 is opposite to the first and second elastic members 137 and 138, and is formed between the first and second projections 134 and 135.

The first and second hooking jaws 182 and 183 are formed on the rotary member 131 to correspond to the hooking projection 181. Specifically, the first and second hooking jaws 182 and 183 are provided between the rotary member 131 and the first and second projections 134 and 135.

Accordingly, the pair of first and second movable grooves 132 and 133, the first and second projections 134 and 135, the handle portion 131a, and the first and second hooking jaws 182 and 183 are formed on the rear surface region 131d of the rotary member 131 (FIG. 4).

The rotating angle between the standby position and the first/second manipulation position of the rotary member 131, which is limited by the stopper unit 180, is 60°. However, the rotating angle is not limited thereto.

Referring to FIGS. 1 and 10, the main control unit 190 controls an operation of the components accommodated in the electronic device main body 110, and controls a signal exchanged with the external device 200. The main control unit 190 includes a circuit board connected to the circuit board 150 of the electronic device main body 110 through the connection cable 150a.

The main control unit 190 receives manipulation signals input through the plurality of manipulation keys 115 and the external device manipulation unit 120 provided on the front surface of the electronic device main body 110. Specifically, if a playback key is input among the plurality of manipulation keys 115, the main control unit 190 plays the corresponding audio signal through the speaker 100a.

In addition, if the external device 200 is connected to the external device connection terminal 111 and the manipulation unit 130 (FIG. 4) is manipulated, the main control unit 190 performs a specified function according to the manipulation position of the manipulation unit 130 sensed through the switch 140. That is, the main control unit 190 performs the first and second functions that correspond to the first or second manipulation position of the manipulation unit.

In the present embodiment, the first function includes a function of generating digital compressed data from a portion of data stored in the electronic device main body 110 and recording the generated data in the external device 200. The second function includes a function of recording all data stored in the electronic device main body 110 in the external device 200.

In addition, the first function further includes a third function to stop the signal exchange between the external device connection terminal 111 and the external device 200 when the rotary member 131 (FIG. 4) returns to the standby position after being stopped in the first manipulation position for a predetermined time. That is, the third function is a function to safely remove the external device 200 from the electronic device 100.

In the present embodiment, since the electronic device 100 is an audio device and the external device 200 is an MP3 player, the first function is converting the track data stored in the CD into compressed digital data and storing (i.e., ripping) the converted data in the MP3 player.

In the present embodiment, only the first to third functions are exemplified, but the functions are not limited thereto. That is, a fourth function of receiving specified data stored in the external device 200 through the electronic device main body 100 and playing the received data may be included.

In addition, in the present embodiment, the manipulation unit 130 (FIG. 4) is provided with a rotary member 131 rotating in a bi-direction, but is not limited thereto. The manipulation unit 130 may employ one of diverse moving methods such as multistage rotation or multistage sliding.

The manipulation of the electronic device having the above-described construction will be described in detail with reference to FIGS. 1 to 7C.

As illustrated in FIG. 1, if the external device 200 is connected to the external device connection terminal 111 provided in the electronic device main body 110, the main control unit 190 controls the light-emitting operation of the first light-emitting members 163. Accordingly, as illustrated in FIG. 2A, the first light-emitting members emit blue light at predetermined intervals.

If a user intends to store the audio data stored on one track among plural tracks stored in a CD accommodated in the electronic device main body 110 in the external device 200, the user rotates the handle portion 131a by applying a manipulation force to the rotary member provided to surround the external device connection terminal 111 in a direction A. At this time, the user releases the manipulation force just after manipulating the rotary member 131 in the direction A.

By the rotation of the rotary member 131 in the direction A, as illustrated in FIG. 6B, the first projection 134 rotates the switch 140 in a direction C. Then, if the manipulation force is released by the user, the rotary member 131 is returned to a standby state, as illustrated in FIGS. 6A and 7A, by the returning force of the first elastic member 137 that has been rotated in the direction A.

Accordingly, the first manipulation position sensing information of the rotary member 131 sensed by the switch 140 is transferred to the main control unit 190 through the circuit board 150, and the main control unit 190 performs the first function.

That is, the data stored on a track among a plurality of tracks stored in the CD inserted into the CD tray 116 of the electronic device main body 110 is stored in the external device 200 connected through the external device connection terminal 111.

At this time, since the main control unit 190 controls the display unit 160, "TRACK RIPPING" is displayed on the display window 161, and the second light-emitting members 164 emit light, for example, corresponding to a direction in which the rotary member 131 is turned as illustrated in FIGS. 2B and 2C.

The user rotates the handle portion 131a provided on the rotary member 131 in a direction B as illustrated in FIG. 2A, and then releases the manipulation force. Accordingly, the rotary member 131 is rotated in a direction A, and thus the second projection 138 rotates the switch 140 in a direction D as illustrated in FIG. 6C. Thereafter, the second elastic member 138 having been rotated in the direction B as illustrated in FIG. 7C is returned to the initial position, as illustrated in FIG. 7A, by the released manipulation force.

Here, by the switch 140 having been rotated in the direction D, the second manipulation position information of the rotary member 131 is transferred to the main control unit 190. Accordingly, the main control unit 190 performs the second function of ripping all the tracks stored in the CD in the external device 200.

At this time, the main control unit 190 controls the display unit 160, and "FULL CD RIPPING" is displayed on the display window 161, and the second light-emitting members 164 emit light as illustrated in FIGS. 2B and 2C.

Alternatively, if the user does no release the manipulation force for a specified time after rotating the rotary member 131 in the direction A, the main control unit 190 performs the third function. Accordingly, "REMOVE USB" is displayed on the display window 161, and the user can safely remove the external device from the electronic device main body 110.

Figure 11:
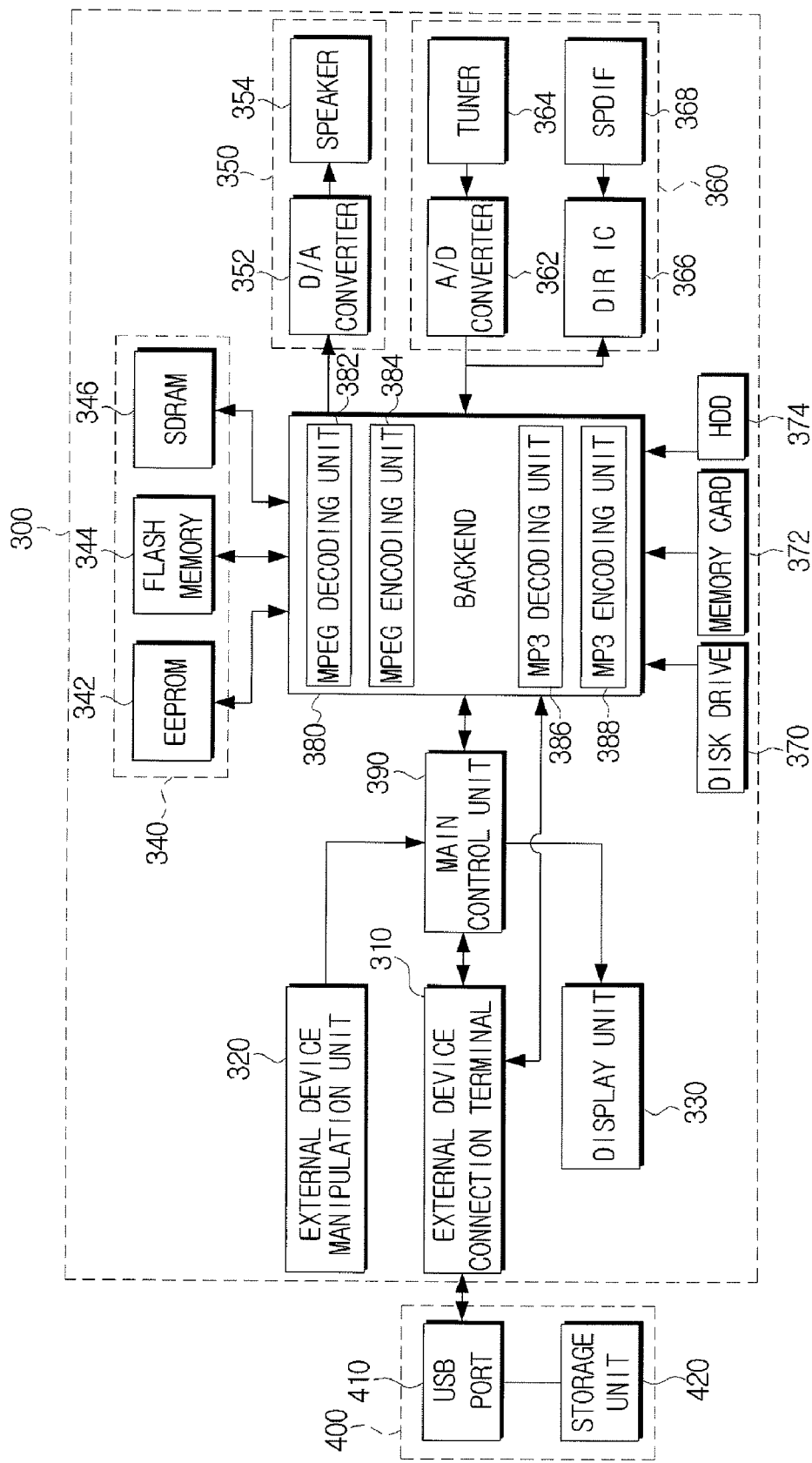
FIG. 11 is a block diagram illustrating an audio device and an MP3 player according to an exemplary embodiment of the present general inventive concept.

FIG. 11 is a block diagram illustrating an audio device and an MP3 player according to an exemplary embodiment of the present general inventive concept.

Referring to FIG. 11, the audio device 300 includes a connection terminal 310, an external device manipulation unit 320, a display unit 330, a backend 380, a storage unit 340, an output unit 350, a receiving unit 360, a CD drive 370, a memory card 375, and a main control unit 390. The connection terminal 310, the external device manipulation unit 320, the display unit 330, the speaker 354, and the main control unit 390 as illustrated in FIG. 11 correspond to the external device connection terminal 111, the external device manipulation unit 120, the display unit 160, the speaker 100a, and the main control unit 190 as illustrated in FIGS. 1 to 10.

The connection terminal 310 is selectively connected to the MP3 player, and serves as a communication interface to perform data communication between the MP3 player 400 and the audio device 300. That is, the connection terminal 310 applies the data received from the MP3 player 400 to the backend 380 under the control of the main control unit 390, or transmits the data applied from the backend 380 to the MP3 player 400.

The external device manipulation unit 320 transfers the information manipulated by the user to the main control unit 390. The external device manipulation unit 320 is disposed on the circuit board 150 and can perform a signal exchange with the main control unit 390.

The display unit 330 displays different expressions on the display window 161 according to the mode of the audio device 300 under the control of the main control unit 390, or the first and second light-emitting members 163 and 164 emit light of different colors.

The storage unit 340 stores programs required to control the audio device 300 and content of the audio device 300, and is provided with an EEPROM 342, a flash memory 344, and an SDRAM 346. The EEPROM 342 stores information that should be maintained even in a power-off state, e.g., setting information, and the flash memory 344 stores programs to control the backend 380 and multimedia content. The SDRAM 346 is a storage space in which diverse data are temporarily stored as a backup. The data stored in the EEPROM 342 and the flash memory 344 is maintained even if the power is turned off, and the data stored in the SDRAM 346 is not maintained.

The output unit 350 receives the audio signal from the backend 380, converts the received audio signal, and then outputs the converted signal to an outside. The output unit 350 is provided with a digital-to-analog (D/A) converter 352 and a speaker 354. Specifically, the D/A converter 352 converts the digital audio signal output from the backend 380 into an analog audio signal, and the speaker 354 outputs the analog audio signal so that the user can hear the audio.

The receiving unit 360 is provided with an analog-to-digital (A/D) converter 362 and a DIR IC 366, and receives and transfers an analog audio signal and a digital audio signal to the backend 380. The A/D converter 362 receives the analog audio signal from the external device 400, converts the analog audio signal into a digital audio signal, and transfers the digital audio signal to the backend 380. The A/D converter 362 can control the signal level and switching operation during transmission of the audio signal. A tuner 364 receives a radio signal and applies the received radio signal to the A/D converter 362. The DIR IC 366 converts the digital audio signal input from the external device through an SPDIF cable 368 into an audio transmission standard called I$^2$S, and transfers the converted signal to the backend 380.

The CD drive 370 reads data from a CD by driving the CD inserted in the audio device 300, and transfers the read data to the backend 380 through an RF amplifier (not illustrated). For convenience in explanation, it is exemplified that the storage medium in which the audio signal is stored in relation to the present general inventive concept is limited to CD. That is, the storage unit 340 stores the programs related to the audio device 300, and the audio device 300 plays the audio signal stored in the CD, which is the storage medium of the audio device 300.

The backend 380 includes an MPEG decoding unit 382, an MPEG encoding unit 384, an MP3 decoding unit 386, and an MP3 encoding unit 388 to perform a decoding or encoding of the audio signal input from any one of a receiving unit 360, an MP3 player 400, a CD, a memory card, and an HDD.

Specifically, the audio signal received from the receiving unit 360 or the CD is decompressed by the MPEG decoding unit 382, and then output to the next output unit 350, or converted into an MP3 file format by the next MP3 encoding unit 388 to be output to the MP3 player. Also, the audio signal of an MP3 file format applied from the MP3 player 400 is decompressed by the MP3 decoding unit 386, and then is output to the next output unit 350.

The main control unit 390 controls an entire operation of the audio device 300, and performs communications using the MP3 player 400 and a host/slave protocol.

Specifically, if the MP3 player 400 is connected to the connection terminal 310 through the USB port 410 and the external device manipulation unit 320 is manipulated to the first manipulation position, the main control unit 390 performs the first function. That is, the main control unit 390 converts a portion of audio data among audio data stored in the CD drive 370 into a file, i.e., converts the analog audio signal into an MP3 file that is the digital signal, and records the MP3 file in the storage unit 420 of the MP3 player 400.

In addition, if the external device manipulation unit 320 is manipulated to the second manipulation position in a state that the MP3 player 400 is connected to the connection terminal 310, the main control unit 390 performs the second function. That is, the main control unit 390 converts all audio data stored in the CD drive 370 into an MP3 file, and records the MP3 file in the storage unit 420 of the MP3 player 400.

As described above, since the function blocks of the audio device 300 read the data stored in the MP3 player 400 to process the read data in a specified format, or process the data stored in the CD in a specified format to store the processed data in the storage unit 420 of the mP3 player 400, in the case where the audio device 300 and the MP3 player 400 are connected together, the audio device 300 serves as a master and the MP3 player 400 serves as a slave.

Alternatively, in the case of performing the first and second functions, the data stored in the CD is read, converted into an MP3 format by the backend 380, and then transmitted to the MP3 player 400. However, the present general inventive concept is not limited thereto. That is, in addition to the data stored in the CD, data output from the HDD 372, the memory card 374, or the receiving unit 360 may be converted into an MP3 format, and then transmitted to the MP3 player 400.

As described above, according to various embodiments of the present general inventive concept, when the external device 200 is connected to the external device connection terminal 111 of the electronic device 100, the user can input a manipulation signal by manipulating the external device manipulation unit 120 provided to surround the external device connection terminal 111. Accordingly, the user can input the manipulation signal to follow the operation of connecting the external device 200 to the external device connection terminal 111, and thus the user's manipulation becomes simplified.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An electronic device, comprising:
    an electronic device main body provided with an external device connection terminal and a plurality of manipulation keys;
    an external device manipulation unit to surround the connection terminal, the external device manipulation unit being movable in at least two positions; and
    a main control unit to control manipulation signals input from the manipulation keys and the external device manipulation unit
    wherein the external device manipulation unit comprises:
    a manipulation unit being manipulated in a state that the manipulation unit surrounds the connection terminal;
    a switch being operated by the manipulation unit; and
    a circuit board on which the connection terminal and the switch are disposed so that the connection terminal and the switch can exchange signals, and the circuit board transferring the signals to the main control unit,
    wherein the manipulation unit is rotatable between a standby position and a manipulation position,
    wherein the manipulation unit comprises:
    a rotary member to rotate from an initial position along an outer periphery of a connection terminal holder to support the connection terminal;
    a projection, formed to project from the rotary member, to operate the switch by a movement of the rotary member; and
    an elastic unit to return the rotary member to the initial position.

2. The electronic device of claim 1, wherein the rotary member is provided with a handle.

3. The electronic device of claim 1, wherein the manipulation unit surrounds the connection terminal and is rotatable in multistages.

4. The electronic device of claim 1, wherein the manipulation unit surrounds the connection terminal and is slidable in multistages.

5. The electronic device of claim 1, wherein the manipulation unit has a first manipulation position by rotating in one direction and a second manipulation position by rotating in an other direction, and the main control unit performs first and second functions which are different from each other corresponding to the first and second manipulation positions, respectively.

6. The electronic device of claim 5, wherein the external device comprises:
    an MP3 player;
    the first function comprises a function of recording a portion of data stored in the electronic device main body in the MP3 player; and
    the second function comprises a function of recording all data stored in the electronic device main body in the MP3 player.

7. The electronic device of claim 6, wherein the first function comprises:
    a third function of safely removing the external device from the connection terminal corresponding to the rotary member remaining in the first manipulation position for a specified time.

8. The electronic device of claim 7, wherein the electronic device main body comprises:
    a CD player.

9. The electronic device of claim 5, wherein the switch comprises:
    a lever switch being interfered with a bidirectional rotation of the manipulation unit and rotating in a bi-direction.

10. The electronic device of claim 9, wherein the elastic unit comprises:
    a first elastic member to press a movable member in the other direction; and
    a second elastic member to press the movable member in the one direction.

11. The electronic device of claim 10, wherein:
    the first and second elastic members comprise torsion springs; and
    the rotary member comprises a pair of movable grooves into which end portions of the first and second elastic members are inserted.

12. The electronic device of claim 11, wherein the elastic unit further comprises:

a sub elastic member, disposed on the lever switch, to return the lever switch to the initial position.

13. The electronic device of claim 11, wherein a frame on which the elastic unit is disposed is provided between the electronic device main body and the circuit board.

14. The electronic device of claim 13, wherein an installation hole to install the connection terminal, the connection terminal holder, and the rotary member is formed on the frame, and hooks to prevent the rotary member from seceding from the installation hole are provided in the rotary member.

15. The electronic device of claim 14, further comprising:
a stopper unit to limit a rotation range of the manipulation unit.

16. The electronic device of claim 15, wherein the stopper unit comprises:
a hooking projection projected from the frame; and
a pair of hooking jaws, provided in the rotary member, to hook to with the hooking projection.

17. The electronic device of claim 16, wherein the rotating angle between the standby position of the manipulation unit and the first/second manipulation position is 60°.

18. The electronic device of claim 1, further comprising:
a display unit to display the manipulation signal input from the plurality of manipulation keys and the external device manipulation unit.

19. The electronic device of claim 18, wherein the display unit comprises:
a display window provided on a front surface of the electronic device main body; and
a light-emitting unit, disposed between the connection terminal and the external device manipulation unit, to emit light of different colors.

20. The electronic device of claim 19, wherein the light-emitting unit comprises:
first light-emitting members, disposed on the circuit board to surround an outer periphery of the connection terminal, to display a connection state of the external device to the connection terminal; and
second light-emitting members, disposed on the circuit board to surround an outer periphery of the first light-emitting members, to display a signal exchange state between the electronic device main body and the external device.

21. The electronic device of claim 20, wherein the first light-emitting members emit light at predetermined intervals when the external device is connected to the connection terminal, and the second light-emitting members emit light corresponding to a rotational directional of the rotary member.

22. The electronic device of claim 21, wherein the first and second light-emitting members comprising:
LEDs emitting blue light and red light, respectively.

23. The electronic device of claim 21, wherein the first and second light-emitting members comprising:
light-emitting diodes emitting blue light and red light, respectively.

24. The electronic device of claim 21, wherein the first light-emitting member emits light even when the manipulation signal is input by the manipulation key of the electronic device main body.

25. The electronic device of claim 21, wherein the connection terminal holder is made of a light-transmitting material, and is provided with an interception wall to intercept a light interference between the first and second light-emitting members.

* * * * *